Patented Sept. 5, 1950

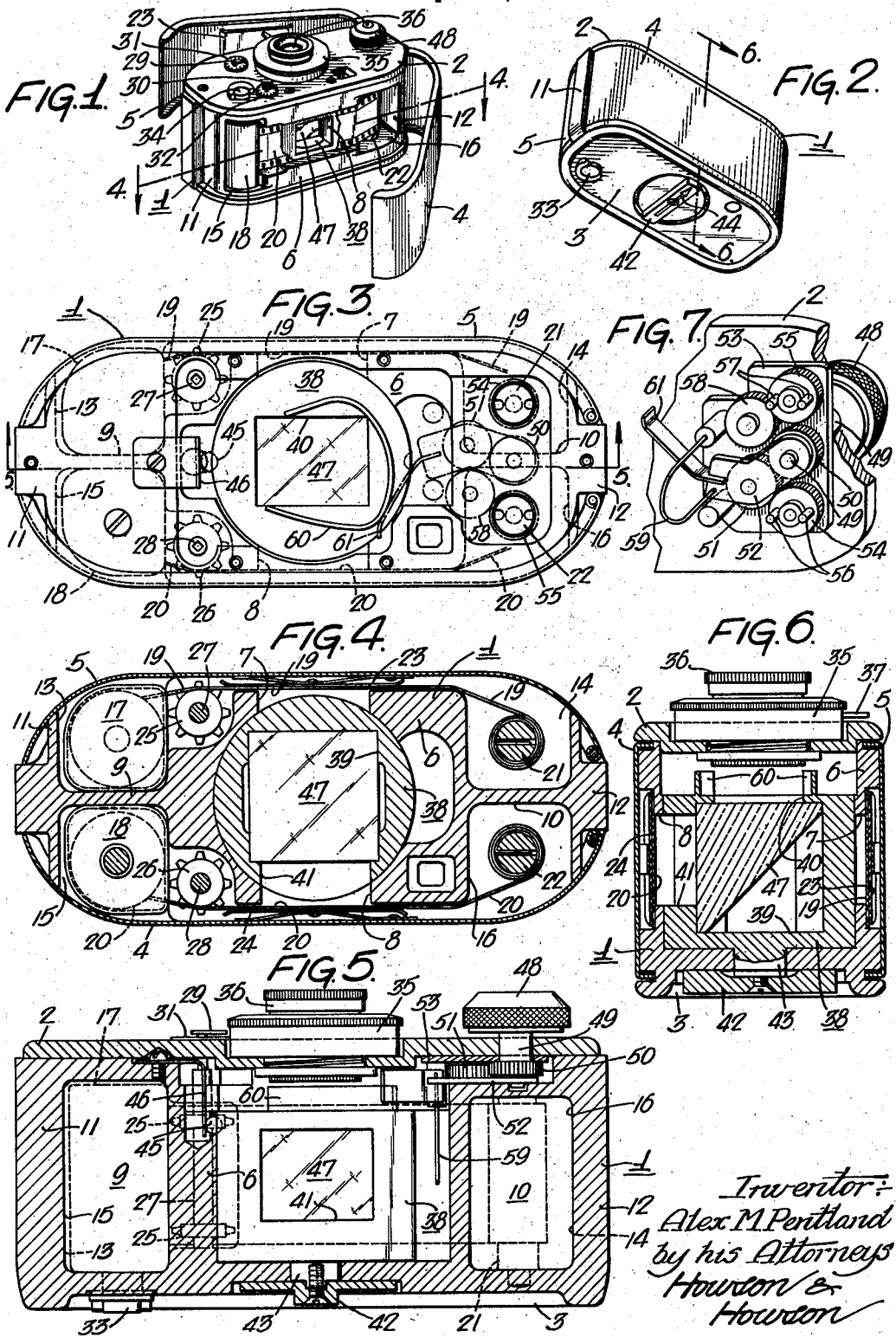

2,521,404

UNITED STATES PATENT OFFICE 2,521,404

PLURAL FILM ROLL HOLDING CAMERA

Alex M. Pentland, Ann Arbor, Mich.

Application April 4, 1946, Serial No. 659,592

3 Claims. (Cl. 95—31)

This invention relates to new and useful improvements in photographic cameras and more particularly to photographic cameras of the roll film type.

Prior to the present invention it has been proposed to provide cameras of the roll film type in which two films can be mounted so that one or the other of the films may be exposed as desired, such an arrangement being particularly useful where it may be desired to use either "black and white" or "color" film. In the past such cameras have been bulky and inconvenient to use, and the adjustments that have been required to shift from one film to the other have been relatively complex.

With the foregoing in mind, one object of the present invention is to provide a photographic camera of the type described in which two rolls of film may be drawn past exposure openings and selectively exposed to a single objective or lens that is fixedly mounted in the camera.

Another object of the invention is to provide a photographic camera of the stated type having a fixed objective or lens and novel selector means operable to selectively expose to said fixed objective or lens one or the other of two film rolls.

Another object of the invention is to provide a photographic camera of the character set forth having a single actuating means operable to advance one or the other of the film rolls through suitable mechanism associated with the film selector means and operable to connect said single actuating means only with the particular film with respect to which said selector means is in exposure position.

A further object of the invention is to provide a photographic camera having the described features and characteristics which is of relatively simplified construction and operation, and which is entirely foolproof in use.

These and other objects of the invention and the various features and details of the construction and operation thereof are hereinafter fully set forth and described with reference to the accompanying drawing, in which:

Fig. 1 is a view in perspective of a photographic camera made according to the present invention showing the front face thereof, hinged cover sections of the camera being opened with respect to the body thereof.

Fig. 2 is a perspective view of the camera showing the rear face thereof.

Fig. 3 is an enlarged plan view of the camera with the front face plate thereof removed to illustrate certain structural features of the invention.

Fig. 4 is an enlarged sectional view longitudinally through the camera taken on line 4—4, Fig. 1.

Fig. 5 is a sectional view taken on line 5—5, Fig. 3.

Fig. 6 is an enlarged sectional view taken on line 6—6, Fig. 2; and

Fig. 7 is an enlarged fragmentary view of one of the features of the invention.

Referring now more particularly to the drawing, reference numeral 1 generally designates a camera body to which are secured a front face plate 2 and side cover members 4 and 5, respectively, the latter being hinged as shown so that they may be opened to insert and remove rolls of film.

The body 1 of the camera comprises a central portion 6 having in its top and bottom exposure openings 7 and 8, respectively, corresponding to the size and shape of the individual "frames" of the films. Extending from opposite ends of the body portion 6 are wall portions 9 and 10 which cooperate with the central portion 6 and the body end portions 11 and 12 to provide pairs of recesses 13, 14, and 15, 16, respectively, at opposite ends of the camera body 1, the said wall portions 9 and 10 serving to separate the recesses of each pair thereof.

Cartridges 17 and 18 containing rolls of film 19 and 20, respectively, are adapted to be mounted in the conventional manner in the body recesses 13 and 15. The end of the film 19 passes from its roll 17 over the exposure opening 7 in the central body portion 6 and is attached to a spool 21 in the body recess 14, and the end of the other film 20 similarly passes from its roll 18 over the exposure opening 8 in the body portion 6 and is attached to a spool 22 in the other body recess 16, for example, as shown in Fig. 4 of the drawing. The films 19 and 20 are held firmly against the central body portion 6 of the camera in overlying relation to the exposure openings 7 and 8 therein by means of spring urged presser plates 23 and 24, respectively. Suitable mechanism, hereinafter described, is provided for actuating the spools 21 and 22 to advance the films 19 and 20 from their respective rolls over the exposure openings 7 and 8 and wind them upon the said spools 21 and 22.

The particular camera illustrated in the drawing is adapted to be used with 35 mm. film of the type having a series of apertures extending along opposite side edges thereof and, in order to indicate to the operator the number of frames of each film that have been exposed, counters are provided for each film which comprise pairs of toothed discs or wheels 25 and 26, respectively, arranged to engage the apertures along the side edges of the films. The pairs of discs 25 and 26 are mounted respectively upon shafts 27 and 28, and the arrangement is such that the discs and their shafts are actuated through one complete revolution for each "frame" of the film advanced through the camera. Pointers 29 and 30 are mounted on the exterior of the front face plate 2 of the camera for rotation relative to dials 31 and 32, respectively, which indicate the number of frames or exposures that have been made, and these pointers 29 and 30 are driven relative to the dials by the shafts 27 and 28, respectively through suitable reduction gearing (not shown). Means 33 and 34 are provided exteriorly of the camera for rewinding the films 19 and 20 after all of the frames thereof have been exposed.

Fixedly secured in the front face plate 2 of the camera is the conventional shutter casing 35 which carries the objective or lens 36 in the usual manner. The shutter may be of any standard type and may include a trigger 37 for operating the shutter mechanism. According to the present invention, there is provided in the camera a film selector device which is operable to expose either of the two films 19 and 20 to the objective or lens 36 fixedly mounted in the camera front plate 2.

As more clearly shown in Figs. 3 to 6 inclusive of the drawings, the film selector device comprises a cylindrical member 38 which is rotatably mounted in the central portion 6 of the camera body 1. The selector 38 is disposed between the exposure openings 7 and 8, and films 19 and 20 which outwardly overlie said exposure openings, and has its rotational axis disposed in coaxial alignment with the objective or lens 36 and parallel to the planes of said films.

Provided within the member 38 is a chamber 39. One opening 40 to said chamber 39 is provided in the end of the member 38 adjacent the objective or lens 36, and another opening 41 to the chamber 39 is provided through the side wall of the member 38, the opening 41 being arranged to register with one or the other of the exposure openings 7 and 8 in the camera body 1 when the member 38 is properly positioned rotationally.

The selector member 38 may be rotated to bring the opening 41 thereof selectively into registry with the exposure openings 7 and 8, for example, by means of a manual actuator, such as a handle 42, which is located exteriorly of the rear face 3 of the camera body 1 and secured to an axially projecting hub portion 43 of the member 38 in the manner illustrated in Fig. 5 of the drawing. Suitable indication, such as an arrow 44, preferably is provided on the actuator 42 to indicate to the operator the particular film and exposure opening with which the selector opening 41 may be associated. In addition, means such as, for example, a ball detent arrangement comprising a ball element 45 biased by a leaf spring 46 may be provided to engage suitably located detents in the external surface of the selector member 38 to releasably retain said member in the operative positions thereof with its opening 41 in registry with the selected exposure opening 7 or 8.

Positioned within the chamber 39 of the selector member 38 is a reflector element such as, for example, a prism or face mirror 47 which is arranged with respect to the openings 40 and 41 of said member 38 so that the view or image to which the objective or lens 36 is directed is transmitted through the selector opening 40 to the element 47 and reflected thereby through the selector opening 41 and thence through the selected exposure opening 7 or 8 to the film 19 or 20 as the case may be. By this construction and arrangement of parts it will be observed that with the selector member in the position shown in the drawing the film 20 may be exposed, and any time that the operator desires to expose the other film 19 it is only necessary to rotate the selector 38 through 180° by means of the actuator 42 thereby positioning the said selector so that its opening 41 registers with the opposite exposure opening 8 with which said other film 19 is associated.

Another feature of the present invention is the provision of a single actuator member 48 that may be rotated by the operator to advance one or the other of the films 19 and 20 through the camera, and while a single film actuator for both of the films is highly desirable in the interests of simplicity of operation of the camera, it is also desirable that such single actuator be operative to advance only the particular film with respect to which the selector member 38 is in exposure position.

According to the present invention, therefore, and referring to Figs. 3, 5 and 7 of the drawing, the actuator member 48 is disposed exteriorly of the front of the camera and is fixed on a shaft 49 which extends inwardly through the face plate 2 and has fixed thereon a gear 50. This gear 50 meshes with a similar gear 51 that is rotationally carried by an arm 52 which is, in turn, pivotally mounted on the inner end of the actuator shaft 49. Rotatably carried by a fixed plate 53 are gears 54 and 55 which drive the film spools 21 and 22, respectively, through pairs of pins 56 and 57 carried by said gears and arranged to engage suitably formed recesses in the upper ends of said spools. Meshed with the gear 55 is an idler gear 58 which is rotatably mounted in the plate 53.

Driving connection from the actuator 48 to the spool 21 to rotate the latter in the clockwise direction with respect to the drawing and wind the film 19 thereon is established by engaging the gear 51 with the spool gear 54 while driving connection from the actuator 48 to the spool 22 to drive the latter likewise in the clockwise direction is established by engaging the said gear 51 with the idler gear 58 which in turn is meshed with the gear 55 associated with said spool 22. The gear 51 normally is urged into engagement with the gear 54 associated with spool 21 by means of a U-shaped wire spring 59.

Secured upon the front face of the selector member 38, or formed as a part thereof, is a cam element 60 which rotates with said selector member 38 and is arranged and configurated so that, in the position of the selector shown in the drawing, with the selector opening 41 in register with the exposure opening 8 and the film 20, the said cam engages a leaf spring 61 which is carried by the arm 52 thereby pivoting said arm counterclockwise against the force of the spring 59 and interengaging the gears 51 and 58, as shown in Fig. 3 of the drawing, to establish a driving connection from the actuator 48 to the spool 22 through the gear 55 so that said spool may be actuated to advance the film 20 through the camera. On the other hand, when the selector member 38 is moved to the other position thereof with its opening 41 in register with the exposure opening 7 and the film 19, the cam 60 moves with said selector and is disengaged from the leaf spring 61 thereby causing the spring 59 to pivot the arm 52 with the result that the gear 51 is disengaged from gear 58 and engaged with the gear 54, as shown in Fig. 7 of the drawing, thereby establishing driving connection from the actuator 48 to the spool 21 to advance the film 19 through the camera.

Since the camera of the present invention is designed and adapted to employ two photographic films as described one of which may be color and the other black and white, or one of which may have a different exposure rating from the other, it is desirable, if not necessary, that the camera be provided with means for indicating to the operator or user the characteristics of the particular film being used so that he may set the shutter opening accordingly. Such means, for example, may comprise suitable devices which may be set by the operator to indicate, for example, the Weston meter reading for each particular film.

From the foregoing, it will be observed that the present invention provides a photographic camera embodying novel features of construction and arrangement wherein two rolls of film may be drawn past exposure openings in the camera and selectively exposed to a single objective or lens that is fixedly mounted in the camera. The invention also provides a photographic camera of the type described embodying novel selector means operable to selectively expose to a fixed objective or lens one or the other of two film rolls. The invention further provides a photographic camera of the character set forth embodying a single actuating means for the two rolls of film which is operable to advance one or the other of the film rolls through suitable mechanism associated with the film selector means and operable to establish driving connection from said single actuating means only to the particular film with respect to which the selector means is in exposure position. Finally, the invention provides a photographic camera having the features and characteristics set forth which is of relatively simplified operation and construction and which is entirely foolproof in use.

While a particular embodiment of the present invention has been illustrated and described herein, it is not intended to limit the invention to such disclosure and changes and modifications may be made therein and thereto within the scope of the claims.

I claim:

1. In a photographic camera, a camera body having two exposure openings therein, a selector rotatably mounted in said body intermediate said exposure openings and having an opening therein arranged to be selectively positioned with respect to one or the other of said exposure openings, means for positioning said selector means, an objective mounted on said camera body in confronting relation to the selector, reflector means carried by said selector operable to receive light from the objective and reflect the same through the selector opening and the exposure opening in the body with respect to which the selector is selectively positioned, said selector masking the other exposure opening from light from said objective, film spools rotatable respectively to advance a film past each of said exposure openings, a film actuator exteriorly of the camera and having a shaft extending interiorly of said camera, drive means actuable by said actuator shaft and arranged for driving connection with one or the other of said spools to rotate the same, spring means operable in one position of said selector to bias said drive means to driving connection with one of said spools, and means on said selector operable in the other position thereof to engage and actuate said drive means into connection with the other of said spools against said bias.

2. In a photographic camera, a camera body having two exposure openings therein, a selector rotatably mounted in said body intermediate said exposure openings and having an opening therein arranged to be selectively positioned with respect to one or the other of said exposure openings, an objective mounted on said camera body, reflector means carried by said selector operable to receive light from the objective and reflect the same through the selector opening and the exposure opening in the body with respect to which the selector is selectively positioned, said selector masking the other exposure opening from light from said objective, film spools rotatable respectively to advance a film past each of said exposure openings, a gear fixed to each of said spools, an actuator exteriorly of the camera including a shaft extending interiorly of the camera and having thereon a drive gear actuated by said actuator, an arm movably mounting said drive gear and movable to engage said drive gear with one or the other of said spool gears to rotate the spool associated therewith, spring means operable in one position of said selector biasing said movable arm in one direction normally to engage said drive gear with one of said spool gears, and cam means carried by said selector means operable in the other position thereof to actuate said arm and engage said drive gear with the other of said spools.

3. In a photographic camera, a camera body having two exposure openings therein, a selector having a chamber therein rotatably mounted in said body intermediate said exposure openings, said selector having therein a first opening to said chamber and a second opening to said chamber arranged to be selectively positioned in register with one or the other of said exposure openings in said body by rotation of said selector, means to rotate said selector, an objective mounted on the camera body in confronting relation to the first opening in said selector, reflector means in said selector chamber operable to receive light from the objective through the first opening in the selector and reflect the same through the second opening therein and the exposure opening in the body with respect to which the selector is selectively positioned, said selector masking the other exposure opening from light from said objective, film spools rotatable respectively to advance a film past each of said exposure openings, a film actuator exteriorly of the camera and having a shaft extending interiorly of said camera, drive means on said shaft in the camera actuable by said actuator and engageable with one or the other of said film spools to rotate the same, and cam means carried by said reflector means operable to effect engagement of said drive means with the spool operable to advance a film past the exposure opening with respect to which said reflector means is selectively positioned.

ALEX M. PENTLAND.

REFERENCES CITED

The following references are of record in the file of this patent:

UNITED STATES PATENTS

| Number | Name | Date |
|---|---|---|
| 634,881 | Dallmeyer | Oct. 17, 1899 |
| 2,245,606 | Rauch | June 17, 1941 |
| 2,384,655 | Stewart | Sept. 11, 1945 |
| 2,439,112 | Teague | Apr. 6, 1948 |

FOREIGN PATENTS

| Number | Country | Date |
|---|---|---|
| 656,624 | Germany | Feb. 12, 1938 |
| 707,146 | Germany | June 14, 1941 |